(12) United States Patent
Negel

(10) Patent No.: US 8,602,575 B2
(45) Date of Patent: Dec. 10, 2013

(54) EXTERIOR REAR VIEW MIRROR

(75) Inventor: Raimund Negel, Unterensingen (DE)

(73) Assignee: SMR Patents S.a.r.l., Luxembourg (LU)

( * ) Notice: Subject to any disclaimer, the term of this patent is extended or adjusted under 35 U.S.C. 154(b) by 54 days.

(21) Appl. No.: 13/242,408

(22) Filed: Sep. 23, 2011

(65) Prior Publication Data

US 2012/0075735 A1    Mar. 29, 2012

(30) Foreign Application Priority Data

Sep. 28, 2010   (EP) .................................... 10180683

(51) Int. Cl.
*G02B 7/182* (2006.01)

(52) U.S. Cl.
USPC ............ 359/874; 359/876; 359/877; 248/487

(58) Field of Classification Search
USPC ................... 359/873–878; 248/479, 481, 487
See application file for complete search history.

(56) References Cited

U.S. PATENT DOCUMENTS

| | | | | | |
|---|---|---|---|---|---|
| 2,656,764 | A | * | 10/1953 | Johnson ........................ | 359/878 |
| 4,105,301 | A | * | 8/1978 | Doeg ............................ | 359/877 |
| 4,540,252 | A | * | 9/1985 | Hayashi et al. ............... | 359/874 |
| 4,611,501 | A | * | 9/1986 | Brown ......................... | 74/502.4 |
| 4,655,022 | A | * | 4/1987 | Natori ............................ | 52/646 |
| 4,732,463 | A | * | 3/1988 | Mittelhauser ................. | 359/878 |
| 4,911,545 | A | * | 3/1990 | Miller ........................... | 359/841 |
| 4,915,493 | A | * | 4/1990 | Fisher et al. .................. | 359/874 |
| 4,919,382 | A | * | 4/1990 | Forman ...................... | 248/178.1 |
| 5,110,196 | A | * | 5/1992 | Lang et al. .................... | 359/874 |
| 5,568,326 | A | * | 10/1996 | Yoshida et al. ............... | 359/872 |
| 5,980,052 | A | * | 11/1999 | Thor et al. .................... | 359/877 |
| 6,270,227 | B1 | * | 8/2001 | Tsuyama ...................... | 359/871 |
| 6,612,707 | B2 | * | 9/2003 | Kaspar et al. ................. | 359/873 |
| 6,796,667 | B1 | * | 9/2004 | Englander ..................... | 359/871 |
| 7,104,663 | B2 | * | 9/2006 | Whitehead .................... | 359/872 |
| 7,178,925 | B1 | * | 2/2007 | Tidwell ......................... | 359/841 |
| 7,311,409 | B2 | * | 12/2007 | Jackson ........................ | 359/876 |
| 8,262,240 | B2 | * | 9/2012 | Negel ............................ | 359/841 |
| 2010/0067131 | A1 | * | 3/2010 | Negel ............................ | 359/877 |
| 2011/0310502 | A1 | * | 12/2011 | Blanchard et al. ............ | 359/850 |
| 2012/0075735 | A1 | * | 3/2012 | Negel ............................ | 359/874 |

FOREIGN PATENT DOCUMENTS

| | | | |
|---|---|---|---|
| DE | 8531670 | | 12/1985 |
| DE | 102004039261 | | 2/2006 |
| EP | 0312232 | | 4/1989 |
| EP | 0654377 | | 5/1995 |
| EP | 2165886 | | 3/2010 |
| FR | 2426590 | | 12/1979 |
| JP | 59167346 A | * | 9/1984 ............... B60R 1/06 |

OTHER PUBLICATIONS

European Search Report for application No. EP 10 180683 dated Jan. 13, 2011.

* cited by examiner

*Primary Examiner* — Frank Font
(74) *Attorney, Agent, or Firm* — Reising Ethington PC

(57) ABSTRACT

An exterior mirror for mounting on a vehicle with a mirror base and a mirror head attached to the mirror base is suggested, whereby the mirroring element is rigidly connected to the housing of the mirror head. The mirror head and mirror base are rotatably connected to one another by means of a ball joint. The adjustment of the mirroring element is done by two bars, of which the length can be adjusted by actuators, which bars are arranged between the mirror head and mirror base.

8 Claims, 3 Drawing Sheets

EXTERIOR REAR VIEW MIRROR

The invention is based on a priority patent application EP 10180683.4 which is hereby incorporated by reference.

BACKGROUND ART

1. Field of the Invention

The invention relates to an exterior mirror for a motor vehicle, particularly to an exterior mirror, which is attached to motor vehicle doors, in order to provide an exterior rear view for the driver of the motor vehicle.

2. Description of the Related Art

For vehicle mirror constructional systems mounted outside on a motor vehicle door, it has long been desirable that they can be moved from a normal working position into a folded position either by means of a drive, by manual operation or in reaction to unintentional shocks acting on them. Many mirrors, which have this capability, are simple movable mirrors, which are pivotably arranged about a substantially vertical axis. Simple movable mirror constructional systems have a bracket assembly, which is attached to the motor vehicle, for example, on the vehicle door, and a mirror housing arrangement, which normally supports an adjustable mirror element and a driven pivot assembly, which makes it possible for the housing assembly to be pivoted in relation to the bracket assembly about the substantially vertical axis between the work position and the folded position in relation to the vehicle, in reaction to a drive actuation of the pivot assembly.

Generic rear mirrors generally have a mirror base, which is fixed to the bracket assembly or to the mirror bracket. In the process, the mirror bracket is attached to the mirror base in such a way that it can pivot about the vertical axis. The mirror base can here be attached to the motor vehicle with suitable attachment means. Furthermore, the various components required for the function of an exterior mirror, such as a mirror element, an adjustment mechanism, an adjusting drive, a heating device and the mirror housing can be attached to the pivotably mounted mirror bracket.

Due to regulatory requirements, the mounting of the mirror bracket such that it can pivot about the vertical axis on the mirror base is essential: This particularly serves to reduce the risk of injury in the event of a collision between a road user and the exterior rear view mirrors protruding sideways from the bodywork of the motor vehicle. Furthermore, the pivoting of the rear view mirror about the vertical axis serves for a folding process of the rear view mirror onto the bodywork, in order to prevent contact of the rear view mirror with the corresponding door frames or garage walls in the event of shunting in narrow gateways, garages or similar, and to protect the rear view mirror from damage.

An exterior mirror is known in DE 102004039261, which is attached on the door shoulder of the motor vehicle. The mirror is pivoted both about a vertical axis by two adjustment motors, as well as about a horizontal axis by a second motor.

This approach does not considerably differ from the prior art, in that two drives are also used, namely a glass drive and a drive for folding down. The mirror head is heavy due to the mounting of a motor in the mirror head, and the design of the mirror base must take the weight into account.

An exterior rear view mirror is known in EP2165886, which omits a glass adjusting device in the mirror head, and effectuates the adjustment of the mirror position by means of linear adjustment motors. The arrangement of the length-adjustable elements, which are operated in pairs, is optimized for attachment in a mirror triangle on the side of a vehicle. Furthermore, four adjustment motors are necessary.

DE 8531670.9 describes an exterior mirror with a fixed mirror, which is attached to the vehicle by means of a ball joint and a mirror base. The exterior mirror is adjusted by linkage to the ball joint lying in the mirror head. Two motors serve for this purpose, which indirectly engage on the individual ball joint of the mirror by means of a universal joint and threaded spindles. In the process, the motors are arranged in the mirror head, which therefore becomes heavy.

SUMMARY OF THE INVENTION

The object of the present invention is therefore to create an exterior mirror for a motor vehicle of the type named at the outset, which combats the above-named disadvantages, particularly maintaining the functions of the exterior mirror, although there is no glass adjusting drive in the mirror head.

According to the invention, this object is achieved by an exterior mirror for mounting on a vehicle, with a mirror base and a mirror head fitted on the mirror base, whereby the mirroring element is rigidly connected to the housing of the mirror head. The mirror head and mirror base are rotatably connected to one another by means of a ball joint. The adjustment of the mirroring element is done by two bars, of which the length can be adjusted with actuators, which bars are arranged between the mirror head and mirror base, and define two rotation axes lying perpendicularly to one another.

BRIEF DESCRIPTION OF THE DRAWINGS

Designs of the invention are shown in the figures and are subsequently described.

DETAILED DESCRIPTION OF THE DRAWINGS

The figures show an exterior mirror, which consists of a mirror head 1 and a mirror base 7. The mirror head consists of plastic components, which are produced in a form which is appealing and aerodynamically practical. The housing covers include a cavity, in which functional components of the exterior mirror can be accommodated. For example, electrical components such as a mirror heating, antenna, sensors, illuminated elements such as mirror turn signals, background light fittings, daytime running lights etc. are accommodated here.

The cavity is available as an accommodating space for electrical components, since the presented mirror glass adjustment scheme does not intend that a glass adjustment drive is used behind the mirror glass. The installation space in the housing becomes free by omitting the glass drive behind the mirror glass.

Figure 1:
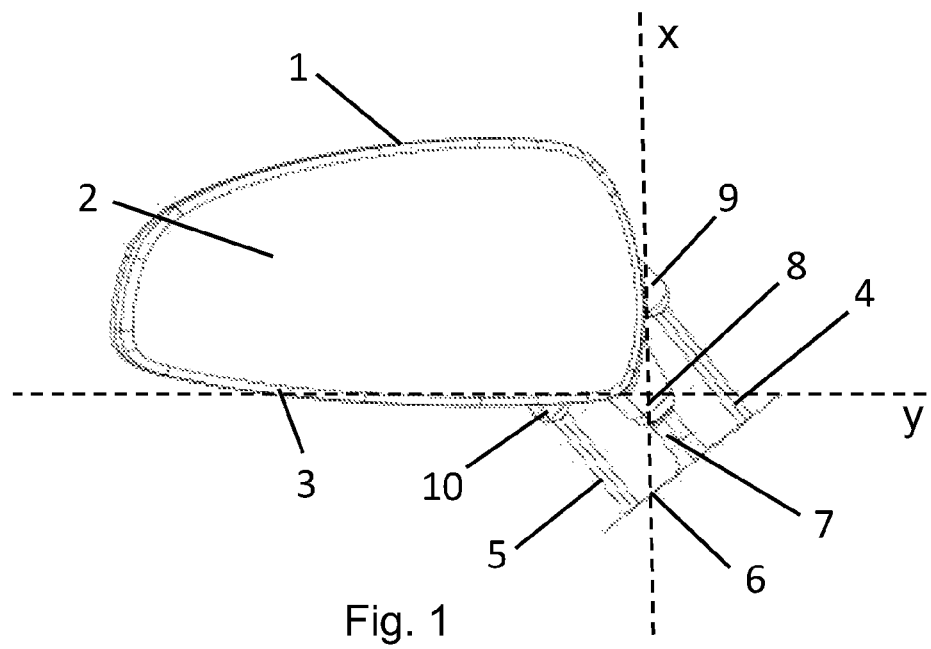
FIG. 1 shows an exterior mirror in the direction of movement seen from the front.

In the front view of FIG. 1, the housing covers are closed by a mirroring element 2, which is fixed in a mirror frame 3. The mirroring element 2 is a glass mirror coated in a common metal, or a plastic mirror, however, which is applied on a plastic substrate. As the mirror glass is directly fixed in the plastic components of the housing, a glass backing plate is omitted as a component. In the process, the mirror frame 3 can be designed as a separate component, which is put onto the building parts from the front, and therefore seizes the glass, or the mirror frame is formed directly on the housing in such a way that the mirror glass can be pressed in from the front and is fixed.

The use of plastic glass has advantages. The low weight of the plastic glass reduces the total weight of the mirror head, so that the mirror base and the adjustment mechanism can have a considerably lighter form.

The plastic mirror can be positioned over a circumferential groove of the housing and fixed by a ridge, by which the plastic mirror is pressed during assembly. A construction with a plastic mirror, onto which a mirror frame is simultaneously extruded, is also possible.

The mirror head is mounted on the vehicle 6 with the mirror base 7, whereby the mirror base 7 is connected to the vehicle, here with the vehicle door, in a fixed and non-rotatable manner. The base can be produced from metal or plastic, as well as from composite materials. The basis of the base is bolted down in the vehicle door with a backing plate, and lies flush on the door shoulder, sealed to the outer door panel by a seal.

However, the exterior mirror according to the invention is not limited to its use as a door shoulder mirror; it can also be mounted on the mirror triangle.

In the process, the mounting of the mirror base can be effectuated by any method known to an expert.

In addition to the mirror base 7, two length-adjustable bars 4, 5 make the connection between the vehicle and the mirror head. Driven by actuators, the two length-adjustable bars 4, 5 telescope between extended and retracted configurations. To accomplish the extension and retraction, any one of linear actuators, motors with gears, pneumatic adjusters or hydraulic adjusters may be used.

The drives are installed either directly into the telescope bars or at their attachment to the vehicle. The upper telescope bar 4 is connected to the mirror head by a ball joint 9, and the lower telescope bar 5 is connected by a ball joint 10. The connection to the vehicle also takes place by ball joints, which are not shown in detail in the drawing.

For a reproducible adjustment of the mirror head with the mirror glass, it is advantageous to define two adjustable axes, which lie perpendicularly to one another. Therefore, the first adjustable axis x is defined by the connection of the central point of the ball joints 9 and 8, as well as an adjustable axis y perpendicular thereto is defined by the central points of the ball joints 8 and 10.

If the upper telescope bar is lengthened along L1, the mirror head rotates about the axis x; in lengthening of the lower telescope bar along L2, the head rotates about the y axis. In this example, the rotation axes lie in the co-ordinate system of the vehicle and run vertically and horizontally.

Figure 2:
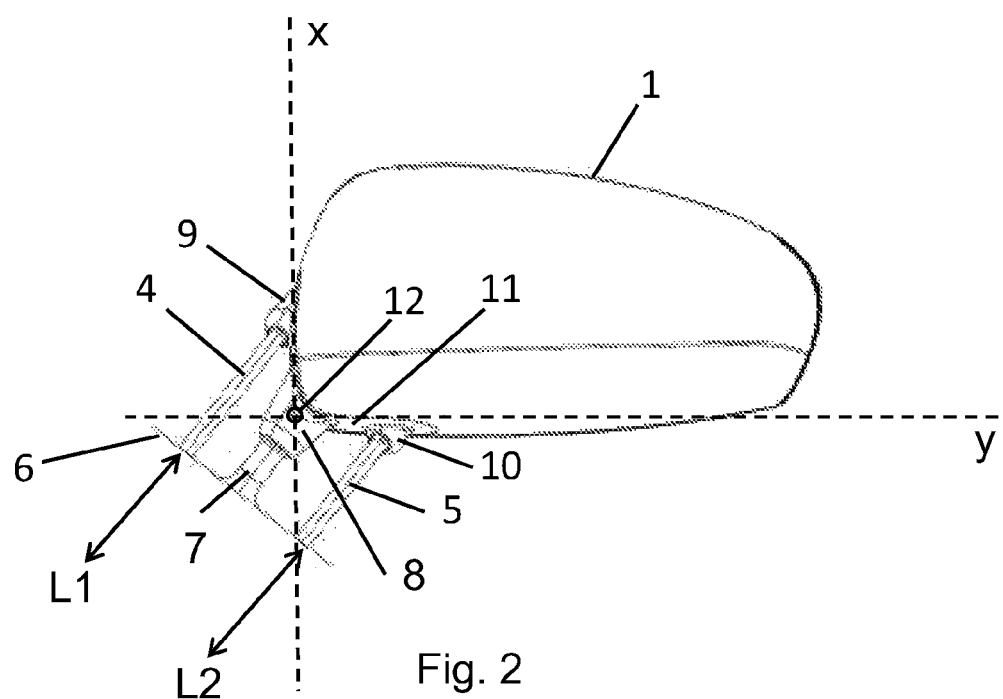
FIG. 2 shows an exterior mirror in the direction of movement seen from the rear.
Figure 3:
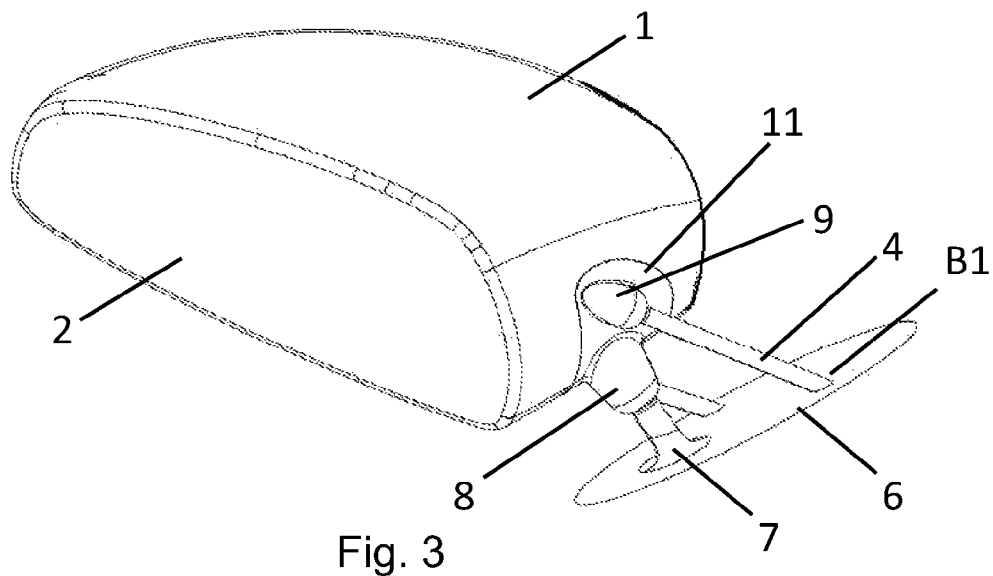
FIG. 3 shows an exterior mirror from the side.
Figure 4:
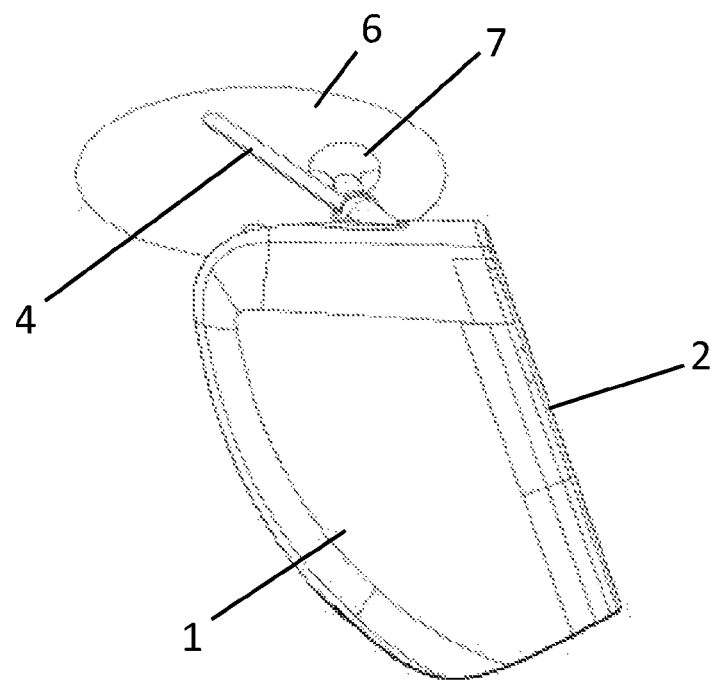
FIG. 4 shows an exterior mirror from above.
Figure 5:
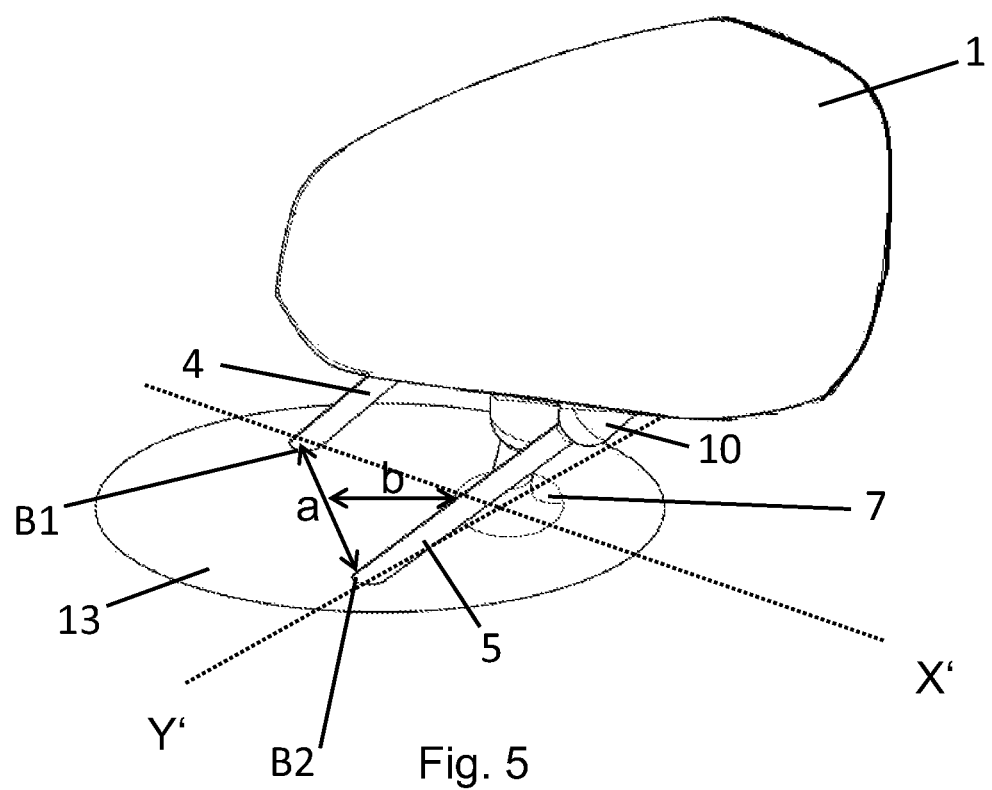
FIG. 5 shows a top view of the attachment plane.

In FIG. 2, the central point 12 of the ball joint 8 of the mirror base is marked, through which both of the axes run. The mirror glass can be adjusted to the driver with both length-adjustable telescope bars. The view in FIG. 3 and FIG. 5 shows that the three fastening points of the mirror base and both telescope bars do not lie in a line, but rather form a triangle on the vehicle plane 13. Here, the distance of both telescopic bars is the value a, and the distance b denotes the position of the mirror base fastening perpendicular to distance a. In the process, the distance a can be very small; a common fastening of both telescope bars to the vehicle is also possible here. The reduction of the distance a hardly affects the adjustment of the mirror glass, but influences the stability of the design. A value of greater than 50 mm is therefore preferred. The distance b from the connecting lines of both fastening points B1 and B2 of the telescope bars on the vehicle is relevant for the folding-down movement of the mirror head, and shall not fall below a value of 50 mm.

The dimensions of the triangle on the vehicle plane 13 with the three fastening points are strongly influenced by the structural conditions of the vehicle.

The projection of the x and y axes is also marked on the vehicle level 13 with the notation x' and y'.

According to the mounting position of the exterior mirror and angle of the mirror base, it is expedient to tilt the rotation axes with regard to the co-ordinates of the vehicle. It is also possible to arrange the rotation axes so that they are not perpendicular to one another. An arrangement of this type requires an adapted control of the rotational motion in order to achieve the desired mirror position.

The fastening points of the ball joints 8, 9 and 10 on the mirror head also do not have to lie in a straight line. The ball joints are connected to the mirror head by a link plate 11. This plate can be made from plastic or metal, and serves as a mount for the fastening of the moving mechanism.

The folding-down function of in the direction of movement and the opposite direction of movement can be implemented with the mechanism. Movement takes place via a parallel change of the lengths of both telescope bars. If both telescope bars are lengthened, the mirror folds down in the opposite direction of movement. If both bars are shortened, the mirror is set to the contour of the vehicle in the direction of movement.

As a safety function, in the event of an impact on the mirror, folding down is possible, with the telescope bars being pushed together or extended. A friction clutch or a similar arrangement must be present for this in the drive of the telescope bars, in order to allow a quick change of lengths.

For the supply of the electrical loads in the mirror head, an electrical connection is led through the mirror base and the ball joint is led into the mirror head.

The embodiment shown has no mirror base cover, which would obscure the actual mirror base 7 as well as the telescope bars 4 and 5.

For the technical solution shown, only a flexible mirror base cover, which can follow the movements, is possible. Here, as an example, textile materials with metallic coating or also metallic webbing can be used.

LEGEND

1 Mirror head
2 Mirror glass
3 Mirror frame
4 Upper telescope bar
5 Lower telescope bar
6 Vehicle door
7 Mirror base
8 Ball joint of the base
9 Ball joint—upper telescope bar
10 Ball joint—lower telescope bar
11 Link plate
12 Head/base centre of rotation
13 Vehicle plane
L1 Direction of movement—upper telescope bar
L2 Direction of movement—lower telescope bar
a Distance between telescope bars—fastening plane
b Distance of the mirror base, perpendicular to a
B1, B2 Fastening points of the telescope bars on the vehicle

The invention claimed is:

1. Exterior mirror for mounting on a vehicle, the exterior mirror comprising:
   a mirror base being connected to the vehicle;
   a mirror head mounted to the vehicle and the mirror base, with a mirroring element, whereby the mirror head is attached to the mirror base, and the mirror head and mirror base are rotatably connected together by a mirror base ball joint;

a link plate fixedly secured to the mirror head, the mirror head engaging two bar ball joints and the mirror base ball joint of the mirror base; and two length-adjustable bars making independent connection between the link plate and the mirror base to allow adjustment of the mirroring element, whereby the two length-adjustable bars define two rotation axes for the mirror head, which run through the mirror base ball joint, and the length of the two length-adjustable bars can be adjusted by actuators, and the two bars engage on the mirror head via the two bar ball joints.

2. Exterior mirror according to claim 1, wherein the rotation axes are defined by the connection lines between the mirror base ball joint and the bar ball joints.

3. Exterior mirror according to claim 2, wherein the rotation axes lie perpendicularly to one another.

4. Exterior mirror according to claim 1 including a frame fixes the mirroring element in the mirror head.

5. Exterior mirror according to claim 1, wherein both rotation axes x and y meet in a central point of the mirror base ball joint.

6. Exterior mirror according to claim 1, wherein each of the mirror base and the two length-adjustable bars defines a fastening point such that all of the fastening points form a triangle in a plane of the vehicle.

7. Exterior mirror according to claim 6, wherein the fastening points are configured such that a perpendicular distance from the fastening point of the mirror base to a line extending between the fastening points of the two length-adjustable bars is at least 50 mm.

8. Exterior mirror according to claim 1, wherein the mirroring element contains a plastic substrate.

* * * * *